Sept. 15, 1931.    R. L. FRINK    1,823,356
REFRACTORY ARTICLE
Filed Nov. 20, 1926
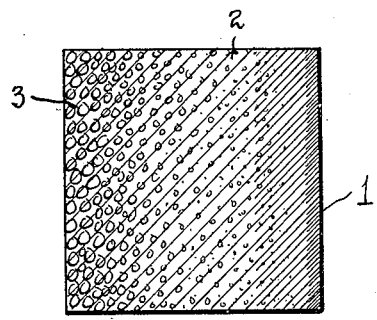
INVENTOR.
Robert L. Frink.
BY
Fay, Oberlin & Fay
ATTORNEYS.

Patented Sept. 15, 1931

1,823,356

UNITED STATES PATENT OFFICE

ROBERT L. FRINK, OF LANCASTER, OHIO

REFRACTORY ARTICLE

Application filed November 20, 1926. Serial No. 149,604.

This invention relates to refractories, and more particularly such material as is of a character adaptable to desired shapes or to continuous linings. Heretofore great difficulty has been experienced in obtaining material which would withstand the imposed temperatures and at the same time effect sufficient heat insulation as to be practical, particularly where very high temperatures are employed. Among the objects of the present invention are the provision of an improved refractory, and methods that are practical and effective, which may be employed in connection with the preparation of refractory units or articles or with new installation or with repair of existent installation.

To the accomplishment of the foregoing and related ends, the invention, then, consists in the features hereinafter described, and particularly pointed out in the claim, the following description and the annexed drawing setting forth in detail but one of the various methods in which the principle of the invention may be used.

In said annexed drawing:—

The sole figure represents a section through a body of material in accordance with the present invention.

Heretofore there have been numerous attempts to make a refractory shape in a sort of integral mass by using as a base ordinary fire-clay and surfacing this with more refractory materials, such as bauxite, etc., but on account of the disproportionate shrinkage in drying and firing, and the different coefficient of expansion and contraction of the respective components, successful results have not been attained.

With the present invention, an exposed surface of desired density and refractory character may be had, and with a body of differing porosity, but all of a coefficient of expansion such as to avoid disruptive stresses.

The reference character 1 in the drawing designates the face or surficial portion of a refractory, and such portion may be of very dense character. The body is of relatively greater porosity, and this may comprise zones of graduated character, for instance the reference numeral 2 designates an intermediate zone in which the porosity is more prominent, and the zone or portion 3 is characterized by still greater porosity. Instead of having sharply demarked zones, I also contemplate gradating or shading off the extent of porosity from a surficial portion to the back portion of the material.

In forming such material, I prefer to employ a composition containing silica, boron compounds, alkaline earths, and alkalies, and I may include more or less highly refractory substances such as sillimanite, mullite, thoria, or zirconia, and other rare earths. As an illustration, an effective composition may be made up of ignited silica about 40 parts, fused or anhydrous boric acid about 20 parts, ignited thorium oxide about 15 parts, ignited zirconium oxide about 15 parts, sodium chloride about 2 parts, and magnesium chloride about 8 parts, all by weight. These constituents are preferably ground to fine mesh, for instance 1/100ths inch or finer and ten parts of this may then be mixed with 90 parts of sillimanite or the like, in graded and sized particles. Water is added to make the mass sufficiently plastic for molding, and this may then be formed into the shape desired, either as a unit or shaped article or as a mass applied to a wall to be repaired or lined or as may be required. Whatever the refractory material employed, my invention contemplates providing more or less porosity either gradated or zoned as desired, and such porosity may be attained by admixing for the desired portions amounts of granular or the like material destructible at the temperatures to which the refractory will be subsequently subjected. As examples of feasible materials for this purpose, there may be employed sawdust or particles of wax or rosin etc., the destructible or fugitive particles being mixed in to the refractory mass for those portions intended to be porous, and in relative amounts as determined thereby. An advantageous way of handling the material is to apply it by means of a cement gun, such as is commonly used for applying stucco or cement; and with the material in a suitable state of plasticity, it may thus be thrown into position in the form to be built up, whether the supporting surface be a wall in situ to be repaired or faced or whether the supporting surface be a form or mold. By using a form, an integral wall may be built up in such general manner, and the successive portions as applied may be varied as to their content of fugitive particles added; similarly in the case of a mold for units or block shapes to be produced. The refractory material for instance may be applied to the supporting surface or form initially without any content of the fugitive particles until a sufficient surficial portion has been built up, and then the fugitive or destructible particles may be introduced into the mass as it is being applied, and the proportion of such particles may be progressively increased as the building up in thickness proceeds, such that the greatest proportion of the destructible particles will occur in the final portion or layer. Progressively if desired, the greatest proportion of destructible particles may be introduced in the material as first applied and the proportion of such particles may be then progressively diminished to the surficial portion which may be applied entirely free of such destructible particles. Instead of progressively increasing or diminishing the proportion of fugitive particles as applied, I may of course vary the proportion by sharply divided stages or layers, all as may be preferred.

With the material in place, either in the form of a wall or in a mold as the case may be, it is then allowed to dry to a condition suitable for firing. The temperature of firing is such as to destroy the fugitive particles in the refractory mass and leave in place of such particles voids or porosities. The temperature to which the refractory material is raised will desirably be such as to just fuse the less refractory material and allow consequent physical and chemical changes or as the entire operation may be termed, set the material, care being taken of course that voids as provided by the destruction of the fugitive particles be not obliterated by complete flowage of the refractory material to densification. After this treatment, it is desirable especially for shaped pieces or units to again heat in order to give an added finish to the surface. If the refractory material being used is compound silicate of boron, etc. with sillimanite or the like, as instanced above, this temperature may desirably be 1450° C. to 1550° C. or above. Such heating increases the density of the surface to a depth which will depend upon the duration of treatment and the precise temperature employed.

Instead of applying the surficial portion in a plastic or fluent cold state as above described, I also contemplate in some instances applying the material in a fused condition so as to thereby form a facing on a porous mass or block previously produced by the use of the fugitive particles and the heating treatment instanced. In any case however, it will thus be seen that porosity to any desired extent may be provided in the body of a refractory and the surficial portions may be of a density entirely different. This allows of adaptation of materials for various conditions of usage, and in such manner I am enabled to produce refractory shapes of a very superior quality.

The magnesium oxide and magnesium chloride provide the elements for an oxychloride cement which is effective for binding the materials together at low temperature. There is therefore provided a low temperature cement which is effective for sustaining the article before it is subjected to heat. When sufficient heat is applied there is created a new bond for the material. This new bond is of a glass-like character. The glass is magnesium-boro-silicate and perhaps other silicates, certain of the constituents for the glass-like bond being drawn from the constituents which form the low temperature cement.

This composition of matter is broadly claimed in my co-pending application No. 136,383 filed on September 18, 1926.

Other modes of applying the principle of the invention may be employed, change being made in the particular details disclosed, provided the steps or structure stated in any of the following claim or the equivalent of such be employed.

I therefore particularly point out and distinctly claim as my invention:—

As a new article of manufacture, a body of material adapted to withstand high furnace temperatures, the body having a face portion which is dense and continuous in character and having an integral body extending continuously behind said dense face portion, the body being porous and the porosity of the body increasing toward the face thereof opposite said dense face portion.

Signed by me this 30 day of October, 1926.

ROBERT L. FRINK.